US012030758B2

(12) United States Patent
Kawauchi et al.

(10) Patent No.: US 12,030,758 B2
(45) Date of Patent: Jul. 9, 2024

(54) INITIAL SETTING METHOD FOR UNMANNED FORKLIFT

(71) Applicant: Mitsubishi Logisnext Co., Ltd., Nagaokakyo (JP)

(72) Inventors: Naoto Kawauchi, Tokyo (JP); Kensuke Futahashi, Tokyo (JP); Noriyuki Hasegawa, Tokyo (JP); Masafumi Monchi, Nagaokakyo (JP); Koichi Saito, Nagaokakyo (JP)

(73) Assignee: Mitsubishi Logisnext Co., Ltd., Nagaokakyo (JP)

( * ) Notice: Subject to any disclaimer, the term of this patent is extended or adjusted under 35 U.S.C. 154(b) by 319 days.

(21) Appl. No.: 17/694,882

(22) Filed: Mar. 15, 2022

(65) Prior Publication Data

US 2023/0002204 A1 Jan. 5, 2023

(30) Foreign Application Priority Data

Jul. 2, 2021 (JP) ................................ 2021-110897

(51) Int. Cl.

*B66F 9/00* (2006.01)
*B66F 9/06* (2006.01)
*B66F 9/075* (2006.01)
*B66F 9/24* (2006.01)

(52) U.S. Cl.

CPC ............ *B66F 9/063* (2013.01); *B66F 9/0755* (2013.01); *B66F 9/24* (2013.01)

(58) Field of Classification Search

CPC ........... B66F 9/063; B66F 9/0755; B66F 9/24
See application file for complete search history.

(56) References Cited

U.S. PATENT DOCUMENTS 11,111,121 B2 * 9/2021 Nakamoto ............ B66F 17/003
11,136,228 B2 * 10/2021 Hasegawa ................. B66F 9/12
11,367,043 B2 * 6/2022 Jacobus ............... G06Q 10/087
(Continued)

FOREIGN PATENT DOCUMENTS

EP 2527288 A1 11/2012
JP U-A-62-140096 9/1987
(Continued)

OTHER PUBLICATIONS

Office Action issued in JP Application No. 2021-110897 dated Jan. 23, 2024.

(Continued)

*Primary Examiner* — Ian Jen
(74) *Attorney, Agent, or Firm* — Blank Rome LLP

(57) ABSTRACT

The initial setting method for the unmanned forklift includes a step of acquiring a measurement value of floor surface inclination of a stop position where the unmanned forklift stops when the unmanned forklift unloads a palette on a rack, a step of setting the stop position where a predetermined inclination pattern is detected, as a precise adjustment position, from the acquired measurement value, a step of causing the unmanned forklift to unload the palette in accordance with an operation program, and measuring a deviation amount of the palette unloaded by the unmanned forklift, at the precise adjustment position, and a step of correcting a command value of the unmanned forklift at the stop position, based on the measured deviation amount.

6 Claims, 12 Drawing Sheets

(56) References Cited

U.S. PATENT DOCUMENTS

| | | | |
|---|---|---|---|
| 2018/0155169 A1 | 6/2018 | Tanaka et al. | |
| 2023/0382703 A1* | 11/2023 | Shigemasa | B66F 9/24 |

FOREIGN PATENT DOCUMENTS

| | | | |
|---|---|---|---|
| JP | A-01-146000 | | 6/1989 |
| JP | A-02-163298 | | 6/1990 |
| JP | A-2003-034497 | | 2/2003 |
| JP | 2005-33076 | A | 12/2005 |
| JP | 2005 330076 | A | 12/2005 |
| JP | 2016-210586 | A | 12/2016 |
| JP | 6542574 | B2 | 7/2019 |

OTHER PUBLICATIONS

Extended European Search Report issued in EP 22161776.4, dated Sep. 9, 2022.

* cited by examiner

<SETTING PROCEDURE OF PRECISE ADJUSTMENT POSITION (RIGHT-LEFT DIRECTION)>

<INCLINATION PATTERN: CONVEX TENDENCY (INVERTED V-SHAPE)>

<SETTING PROCEDURE OF PRECISE ADJUSTMENT POSITION (FRONT-REAR DIRECTION)>

<INCLINATION PATTERN: FORWARD LEANING>

| LINE A1, STAGE B3 | MEASUREMENT DATA(mm) | | |
|---|---|---|---|
| DEVIATION DIRECTION | RIGHT(D3) | CENTER(D1) | LEFT(D2) |
| FRONT-REAR (Fx) | 36 | | 30 |
| RIGHT-LEFT (Fy) | | −3 | |

INITIAL SETTING METHOD FOR UNMANNED FORKLIFT

BACKGROUND OF THE INVENTION

Technical Field

The present disclosure relates to an initial setting method for an unmanned forklift. Priority is claimed on Japanese Patent Application No. 2021-110897, filed Jul. 2, 2021, the content of which is incorporated herein by reference.

Background Art

For example, an unmanned forklift automatically carries out work to measure a distance to a surrounding object with a laser sensor, to identify a position of the unmanned forklift itself and a position of a target cargo (palette), to unload the cargo on a rack, and to load the cargo from the rack (for example, Patent Literature 1).

In order for the unmanned forklift to correctly unload and load the cargo, it is necessary to improve accuracy in identifying the position of the unmanned forklift. Therefore, when the unmanned forklift is introduced into a work area such as a warehouse, it is necessary to actually operate the unmanned forklift in accordance with an operation program prepared in advance and to carry out commissioning (initial setting) work for correcting a deviation amount from an actual environment.

PATENT LITERATURE

Japanese Unexamined Patent Application, First Publication No. 2016-210586

SUMMARY OF INVENTION

Technical Problem

In a work area of an unmanned forklift, a plurality of racks are connected in a right-left direction. A region for one palette in the right-left direction of the rack is called a “line”, and a region for one palette in an up-down direction is called a “stage”. In addition, when the plurality of racks are aligned in a front-rear direction, a region for one palette in the front-rear direction is called a “row”. In initial setting work in the related art, the unmanned forklift measures the deviation amount by actually unloading palettes at all points (stop positions) where unloading and loading are performed, that is, for each row, each line, and each stage of the racks. However, the work is complicated, and requires a large amount of work times.

In addition, in order to improve work efficiency, it is conceivable to thin out locations for measuring the deviation amount in the initial setting work. For example, for the rack in each row, it is conceivable to measure the deviation amount only at three location lines such as both ends and a center in the right-left direction. However, according to this method, when there is a location where a floor surface is discontinuously inclined in the right-left direction at a place other than both ends and the center of the rack (for example, a floor surface having an inverted V-shape or a V-shape) or when there is a location where the floor surface is inclined in the front-rear direction (for example, a floor surface where the unmanned forklift leans forward), the deviation amount cannot be measured at this location. In this case, when the unmanned forklift unloads the palette at a location where the floor surface is inclined in this way, there is a risk in that the palettes or the palette and the rack may come into contact with each other.

The present disclosure is made in view of the above-described problems, and provides an initial setting method for an unmanned forklift which can improve efficiency of initial work while suppressing degradation in operation accuracy of the unmanned forklift.

Solution to Problem

According to an aspect of the present disclosure, an initial setting method for an unmanned forklift includes a step of acquiring a measurement value of floor surface inclination of a stop position where the unmanned forklift stops when the unmanned forklift unloads a palette on a rack, a step of setting the stop position where a predetermined inclination pattern is detected, as a precise adjustment position, from the acquired measurement value, a step of causing the unmanned forklift to unload the palette in accordance with an operation program, and measuring a deviation amount of the palette unloaded by the unmanned forklift, at the precise adjustment position, and a step of correcting a command value of the unmanned forklift at the stop position, based on the measured deviation amount.

Advantageous Effects of Invention

According to the initial setting method for the unmanned forklift according to the present disclosure, efficiency of initial work can be improved while suppressing degradation of operation accuracy of the unmanned forklift is suppressed.

DETAILED DESCRIPTION OF EMBODIMENTS

Hereinafter, an initial setting method for an unmanned forklift according to an embodiment of the present disclosure will be described with reference to FIGS. 1 to 12.

Work Area of Unmanned Forklift

Figure 1:
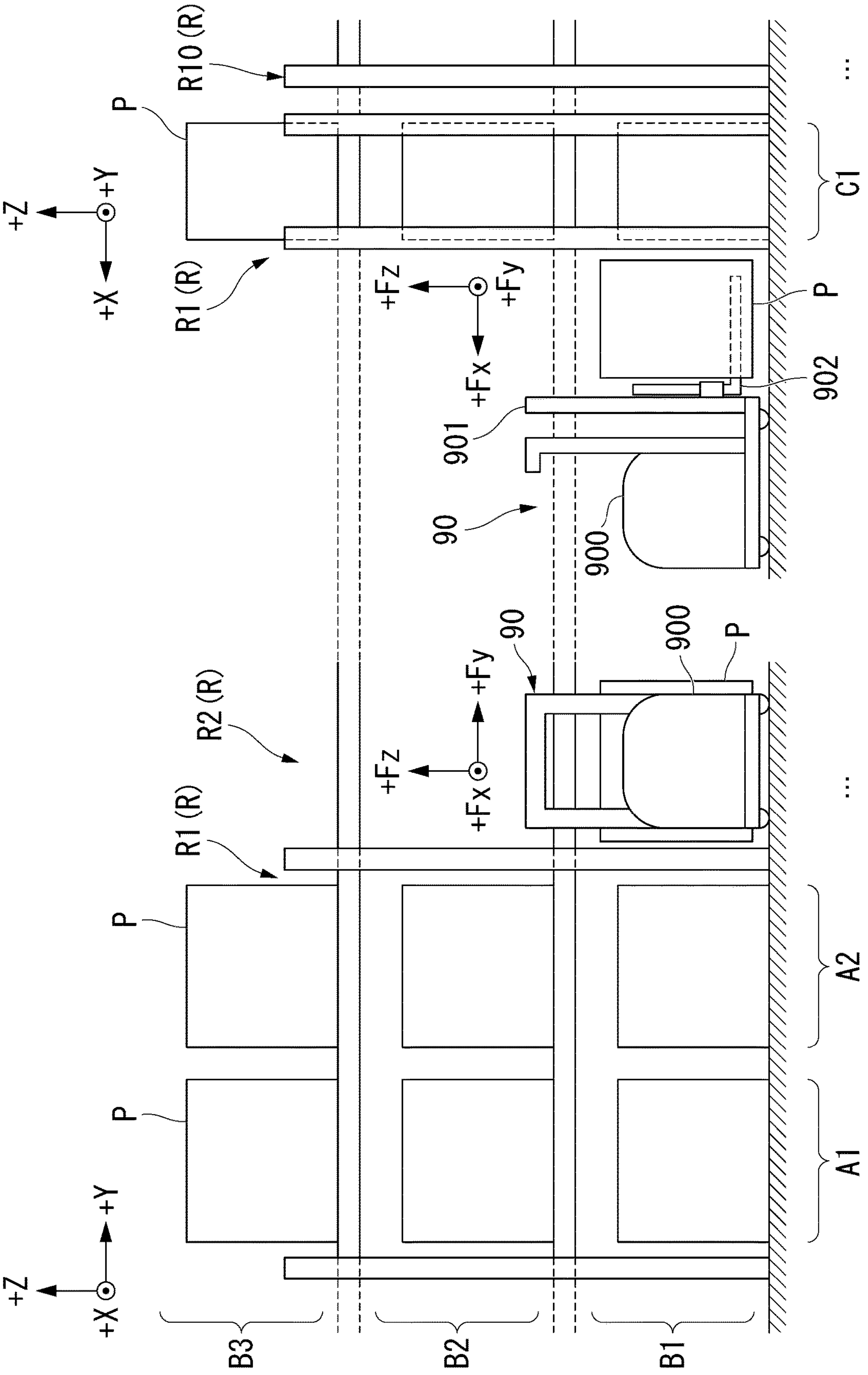
FIG. 1 is a view illustrating a work area of an unmanned forklift according to an embodiment of the present disclosure.

FIG. 1 is a view illustrating a work area of the unmanned forklift according to the embodiment of the present disclosure. As illustrated in FIG. 1, a plurality of racks R are provided in the work area of an unmanned forklift 90. In an example in FIG. 1, the plurality of racks R (R1, R2, and so forth) are connected in a right-left direction (Y-direction, also referred to as a frontage direction). In addition, the respective racks R (R1 and R10) are disposed back to back in a front-rear direction (X-direction, also referred to as a depth direction).

For example, the rack R1 has two lines (lines A1 and A2) indicating a region on which palettes P are placed in the frontage direction (Y-direction). In addition, the rack R1 has three stages (stages B1, B2, and B3) indicating a region on which the palettes P are placed in the up-down direction (Z-direction). In addition, the rack R1 has one row (row Cl) indicating a region on which the palettes P are placed in the depth direction (X-direction). That is, the rack R1 has six places in total for placing the palettes P. The other rack R also has a similar configuration. The numbers of the lines, the stages, and the rows of the racks R are examples, and in another embodiment, the numbers of the lines, the stages, and the rows of the racks R may be increased or decreased.

The unmanned forklift 90 includes a main body portion 900, a lift device 901, and a fork 902. When the unmanned forklift 90 unloads a cargo, the unmanned forklift 90 aligns a position in the right-left direction (Fy-direction) of the unmanned forklift 90 with a predetermined position in the right-left direction (Y-direction) of the line serving as an unloading target, and stops a side (−Fx-side) provided with the fork 902 toward the rack R. That is, a front surface of each line of the racks R is a stop position of the unmanned forklift 90. In the following description, the lines and the stop positions may be described with the same reference numerals in some cases. For example, the stop position corresponding to a line A1 of the rack R1 will also be referred to as a stop position A1.

In addition, the unmanned forklift 90 causes the lift device 901 to move the fork 902 in the up-down direction (Fz-direction) and the front-rear direction (Fx-direction), and performs unloading for placing the palette P at a predetermined position in each stage of each line.

As described above, in the initial setting method for the unmanned forklift 90 in the related art, a deviation amount between a target placement position and an actual placement position of the palette P is measured by causing the unmanned forklift 90 to actually unload the palette P in all the stages of all lines of the racks R. However, a large number of the racks R are installed in a work area. Consequently, according to a technique in the related art, it takes an extremely longtime for the initial setting. Therefore, in the initial setting method according to the present embodiment, floor surface inclination at each stop position of the unmanned forklift 90 is measured by an initial setting jig, and locations where the deviation amounts are actually measured by the unmanned forklift 90 are thinned out to improve efficiency. Hereinafter, details of the initial setting method according to the present embodiment will be described.

Initial Setting Jig

Figure 2:
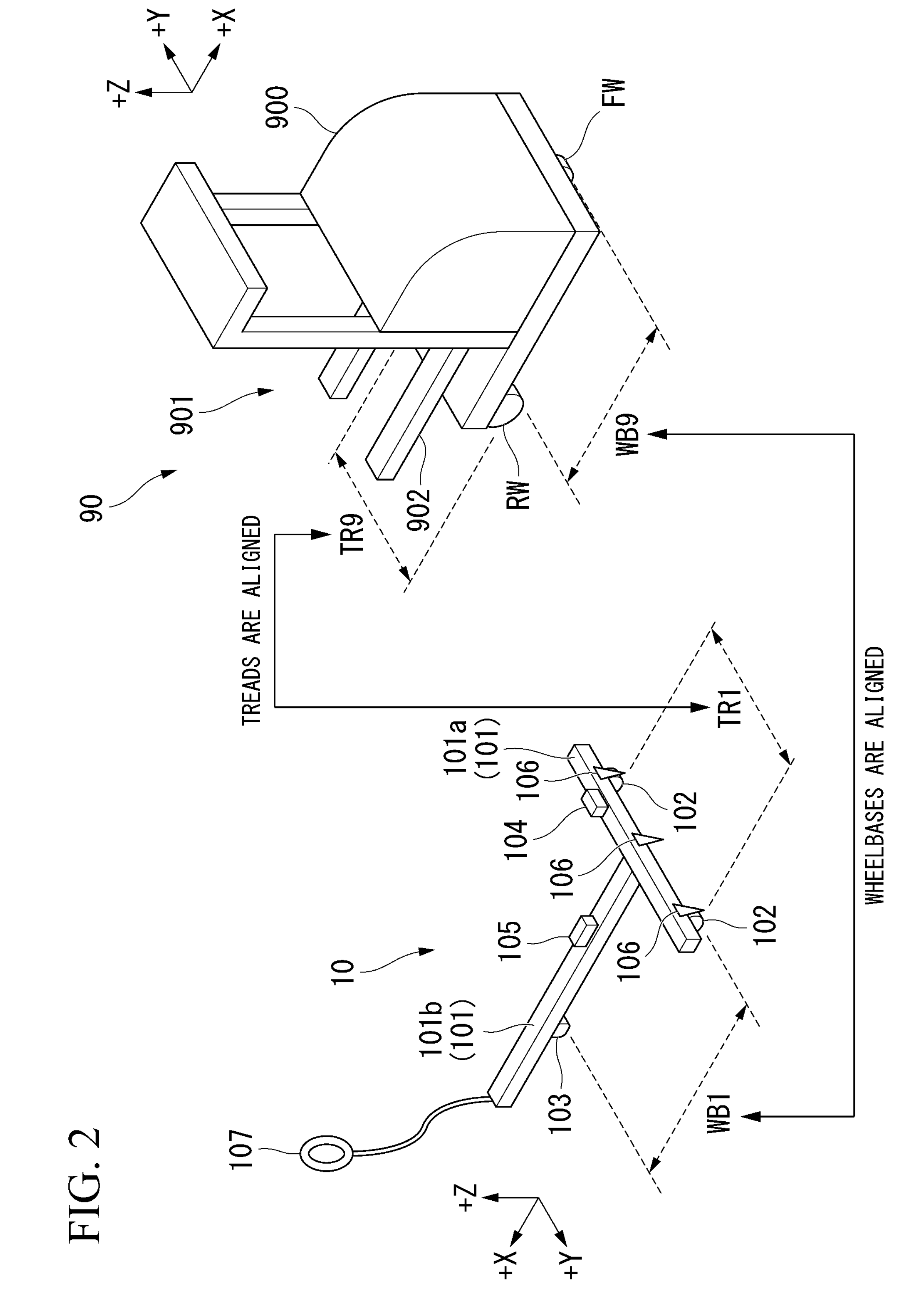
FIG. 2 is a view illustrating a configuration of a jig for initial setting work and the unmanned forklift according to the embodiment of the present disclosure.

FIG. 2 is a view illustrating a configuration of the jig for initial setting work and the unmanned forklift according to the embodiment of the present disclosure. First, an initial setting jig 10 according to the present embodiment will be described. The jig 10 simulates the unmanned forklift 90 actually operated in the work area. The jig 10 is used by the operator to measure the floor surface inclination at each stop position of the unmanned forklift 90.

As illustrated in FIG. 2, the jig 10 includes a main body portion 101, a rear wheel simulation portion 102, a front wheel simulation portion 103, a first inclinometer 104, a second inclinometer 105, and a positioning tool 106, and a handle 107.

The main body portion 101 has a first portion **101*a* and a second portion 101*b*, and is formed in a T-shape when viewed from above. The first portion 101*a* is a T-shaped head portion, and is a frame extending in the right-left direction (Y-direction) of the jig 10. The second portion 101*b* is a T-shaped leg portion, and is a frame extending from the first portion 101*a* in the front-rear direction (X-direction) of the jig 10**.

The rear wheel simulation portion 102 is a pair of tires (casters) attached to a lower side of the first portion **101*a* of the main body portion 101. The rear wheel simulation portion 102 is disposed so that a distance (tread TR1) between the tires in the right-left direction coincides with a tread TR9 of a rear wheel RW of the unmanned forklift 90**.

The front wheel simulation portion 103 is attached to a lower side of the second portion **101*b* of the main body portion 101. The front wheel simulation portion 103 is a leg portion formed of rubber, for example. The front wheel simulation portion 103 is disposed so that a distance (wheelbase WB1) to the rear wheel simulation portion 102 coincides with a wheelbase WB9** of a front wheel FW and the rear wheel RW of the unmanned forklift.

The first inclinometer 104 is installed on the first portion **101*a* of the main body portion 101, and measures the inclination of the jig 10** in the right-left direction (Y-direction).

The second inclinometer 105 is installed on the second portion **101*b* of the main body portion 101, and measures the inclination of the jig 10** in the front-rear direction (X-direction).

The positioning tool 106 is a mark for determining the position of the jig 10 with respect to each line of the racks R. As illustrated in FIG. 2, the positioning tools 106 are provided at three locations such as the center, the right, and the left. The right and left positioning tools 106 are disposed in accordance with the position of the rear wheel simulation portion 102.

The handle 107 is held and pulled by an operator with his or her hand to move the jig 10. The handle 107 may have a string-like configuration as illustrated in FIG. 2, or may be a frame extending upward from the second portion **101*b* of the main body portion 101**.

Initial Setting Method

Figure 3:
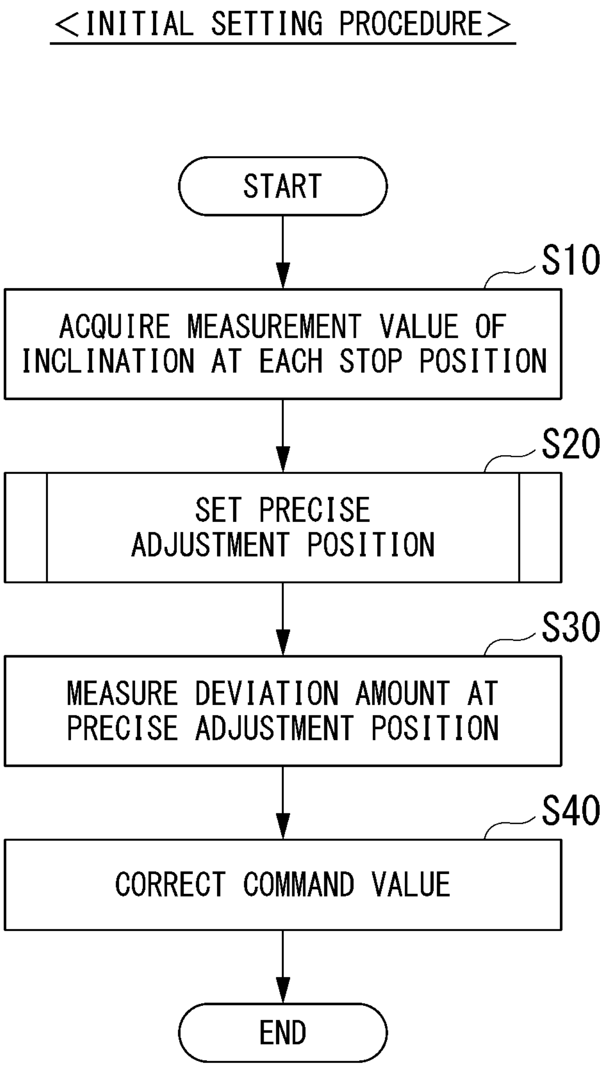
FIG. 3 is a first flowchart illustrating an example of an initial setting method according to the embodiment of the present disclosure.

FIG. 3 is a first flowchart illustrating an example of the initial setting method according to the embodiment of the present disclosure. Hereinafter, details of an initial setting procedure of the unmanned forklift 90 will be described with reference to FIG. 3.

First, the operator who carries out the initial setting work installs the jig 10 at the stop position of the unmanned forklift 90, and measures the floor surface inclination at each stop position (Step S10).

For example, it is assumed that the first line A1 (stop position A1) of the rack R1 (FIG. 1) is measured. The operator installs the jig 10 at the stop position A1. At this time, the operator uses the positioning tool 106 of the jig 10 as a mark, and adjusts the position of the jig 10 so that the positions of the rear wheel simulation portion 102 and the front wheel simulation portion 103 of the jig 10 coincide with the positions of the front wheel FW and the rear wheel RW when the unmanned forklift 90 unloads the cargo on the line A1.

When the jig 10 is installed at the stop position A1, the operator causes the first inclinometer 104 to acquire a measurement value (6X) of the floor surface inclination in the right-left direction (Y-direction in FIG. 1) at the stop position A1. In addition, the operator causes the second inclinometer 105 to acquire a measurement value (6Y) of the floor surface inclination in the front-rear direction (X-direction in FIG. 1) at the stop position A1.

Similarly, the operator measures the floor surface inclination in the right-left direction and the front-rear direction at other stop positions by using the jig 10.

In the jig 10 according to the present embodiment, the rear wheel simulation portion 102 and the front wheel simulation portion 103 are disposed to coincide with the tread TR9 and the wheelbase WB9 of the unmanned forklift 90. In this manner, the jig 10 can simulate how much the unmanned forklift 90 is inclined when the unmanned forklift 90 is stopped at each stop position.

Next, at each stop position, the operator actually operates the unmanned forklift 90 to set a precise adjustment position at which the deviation amount needs to be measured (Step S20). Details of a setting procedure of the precise adjustment position will be described with reference to FIGS. 4 to 11.

Figure 4:
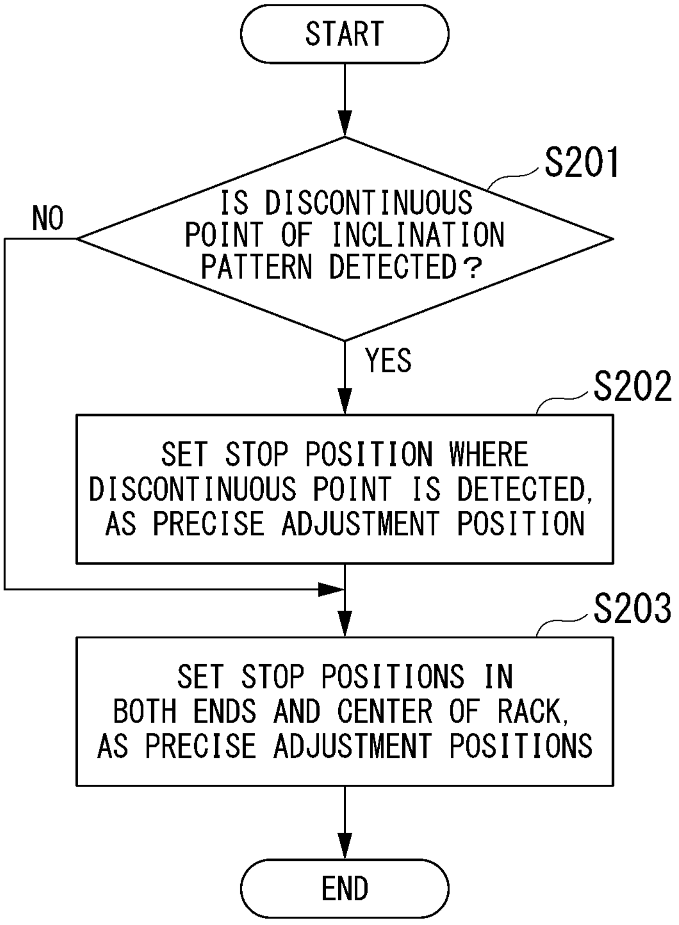
FIG. 4 is a second flowchart illustrating an example of an initial setting method according to the embodiment of the present disclosure.

FIG. 4 is a second flowchart illustrating an example of the initial setting method according to the embodiment of the present disclosure. The flowchart in FIG. 4 illustrates the setting procedure of the precise adjustment position which focuses on the floor surface inclination in the right-left direction (Y-direction in FIG. 1). When the measurement values of the inclination of all of the stop positions are acquired in Step S10 in FIG. 3, the operator sets the precise adjustment position in accordance with the procedure in FIG. 4.

The operator confirms whether or not there is a point where an inclination pattern is discontinuous at each stop position of the plurality of racks R connected in the right-left direction (Y-direction in FIG. 1) (Step S201). When the measurement value (θX) of the first inclinometer 104 is a positive value equal to or greater than an upper limit value (for example, $\theta X \geq +0.1$ degrees), the operator determines that the floor surface is inclined downward to the right. When the measurement value (θX) of the first inclinometer 104 is a negative value equal to or smaller than a lower limit value (for example, $\theta X \leq -0.1$ degrees), the operator determines that the floor surface is inclined downward to the left. In addition, when the measurement value (θX) of the first inclinometer 104 falls within a range of the lower limit value to the upper limit value (for example, $-0.1$ degrees$<\theta X<+$ 0.1 degrees), the operator determines that the floor surface is horizontal.

Figure 5:
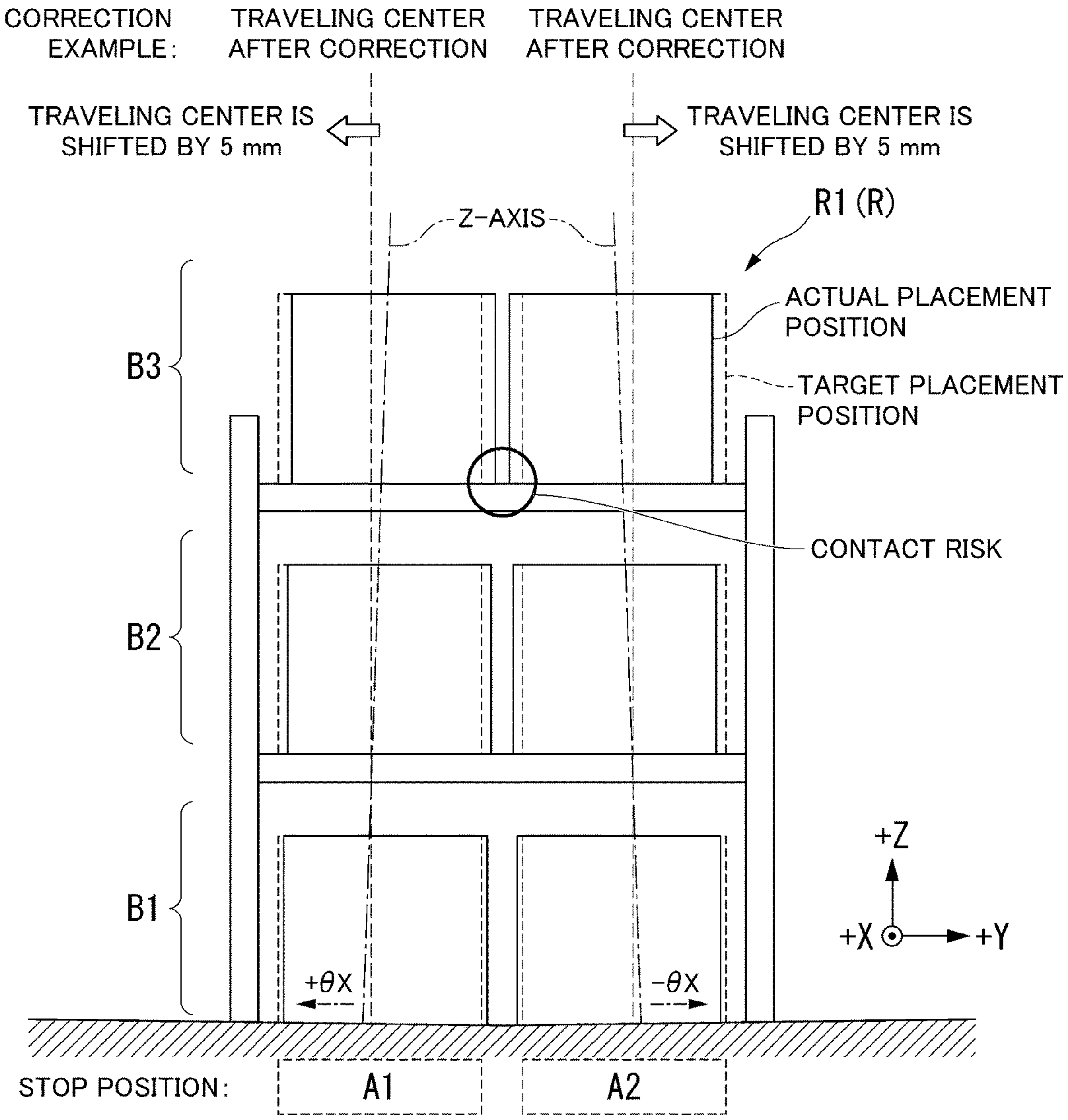
FIG. 5 is a first view illustrating an example of an inclination pattern according to the embodiment of the present disclosure.

FIG. 5 is a first view illustrating an example of the inclination pattern according to the embodiment of the present disclosure. As in an example in FIG. 5, it is assumed that the stop position A1 of the rack R1 is inclined downward to the right and the stop position A2 is inclined downward to the left. In this case, a Z-axis of the stop position A1 is inclined to the right side (+Y-side). In addition, the Z-axis of the stop position A2 is inclined to the left side (−Y-side) in a direction opposite to the stop position A1. That is, the stop positions A1 and A2 show the inclination pattern having an inverted V-shape in which each of the Z-axes is inclined toward the center of the rack R1.

When the unmanned forklift 90 is operated in the rack R1 having the inclination pattern in this way, an Fz-axis of the unmanned forklift 90 is inclined to the right side (+Fy-side) at the stop position A1, and is inclined to the left side (−Fy-side) at the stop position A2. In this case, when the unmanned forklift 90 unloads the palette P, the palette P tends to be placed on the center side of the rack R1 from a target placement position. This tendency is particularly stronger toward an upper stage side. Accordingly, there is a risk in that the palettes P come into contact with each other in the vicinity of the center of the rack R1 in an uppermost stage B3. With regard to the stop positions A1 and A2 having a contact risk, it is necessary to reduce the contact risk by precisely measuring the deviation amount of the unmanned forklift 90 and correcting an operation of the unmanned forklift 90 in accordance with the deviation amount.

Therefore, in this way, when the operator detects that the inclination pattern has an inverted V-shape which is discontinuous (in a reverse direction) at the stop positions A1 and A2 which are continuous to the right and left (Step S201: YES), the stop positions A1 and A2 are set as the precise adjustment positions (Step S202).

Figure 6:
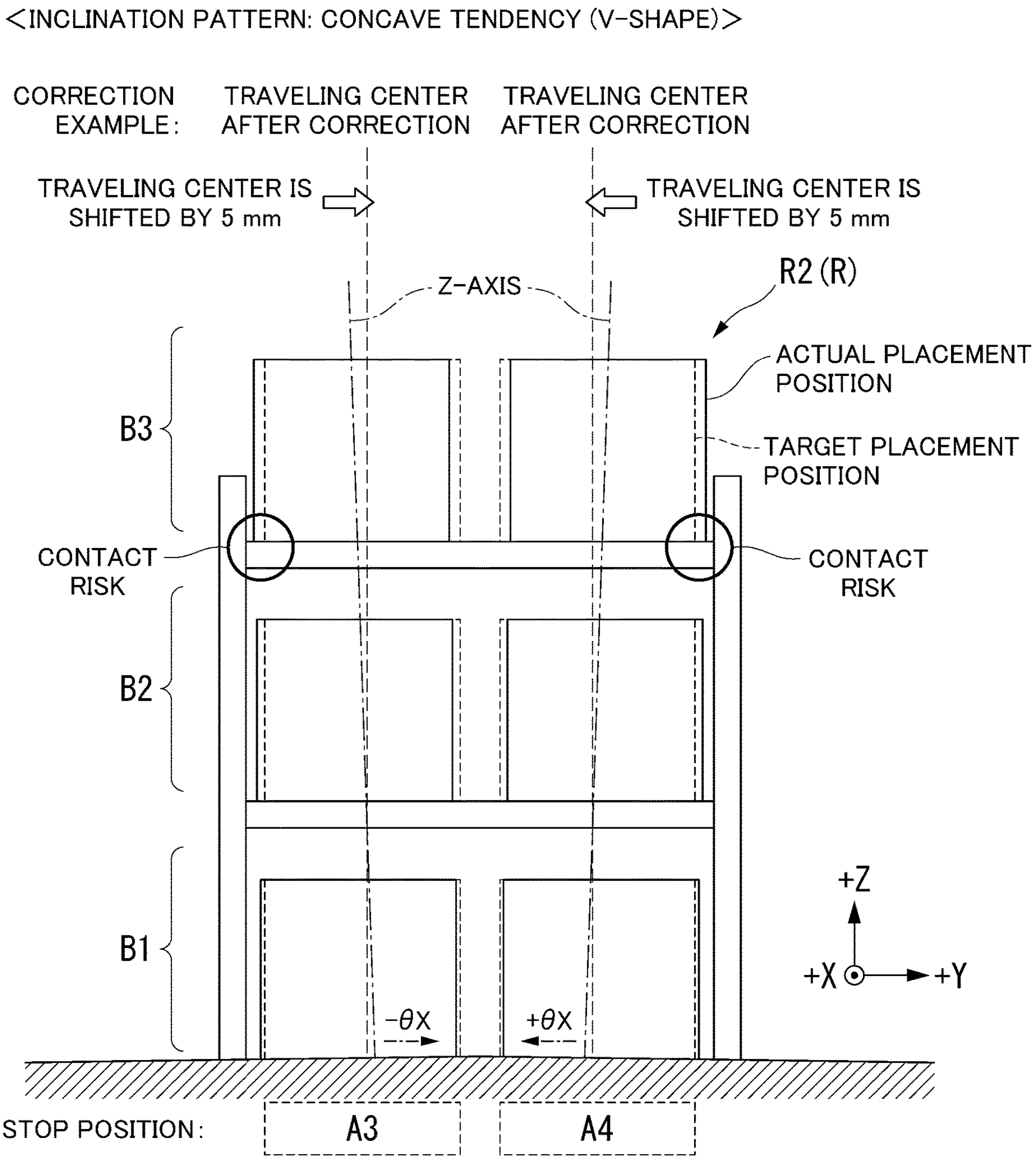
FIG. 6 is a second view illustrating an example of the inclination pattern according to the embodiment of the present disclosure.

FIG. 6 is a second view illustrating an example of the inclination pattern according to the embodiment of the present disclosure. As in an example in FIG. 6, it is assumed that the stop position A3 of the rack R2 is inclined downward to the left and the stop position A4 is inclined downward to the right. In this case, the Z-axis of the stop position A3 is inclined to the left side (−Y-side). In addition, the Z-axis of the stop position A4 is inclined to the right side (+Y-side) in the direction opposite to the stop position A3. That is, the stop positions A3 and A4 show the inclination pattern having a recessed shape (V-shape) in which each of the Z-axes is inclined outward of the rack R2.

When the unmanned forklift 90 is operated in the rack R2 having such an inclination pattern, the Fz-axis of the unmanned forklift 90 is inclined to the left side (−Fy-side) at the stop position A3, and is inclined to the right side (+Fy-side) at the stop position A4. Then, when the unmanned forklift 90 unloads the palette P, the palette P tends to be placed outside the rack R2 from the target placement position. This tendency is particularly stronger toward the upper stage side. Accordingly, there is a risk in that the palette P comes into contact with the rack R2 in the vicinity of both ends of the rack R2 in the uppermost stage B3. With regard to the stop positions A3 and A4 having the contact risk, it is necessary to reduce the contact risk by precisely measuring the deviation amount of the unmanned forklift 90 and correcting the operation of the unmanned forklift 90 in accordance with the deviation amount.

Therefore, in this way, when the operator detects "V-shape" in which the inclination pattern is discontinuous (in the reverse direction) at the stop positions A3 and A4 which are continuous to the right and left (Step S201: YES), the stop positions A3 and A4 are set as the precise adjustment positions (Step S202).

Figure 7:
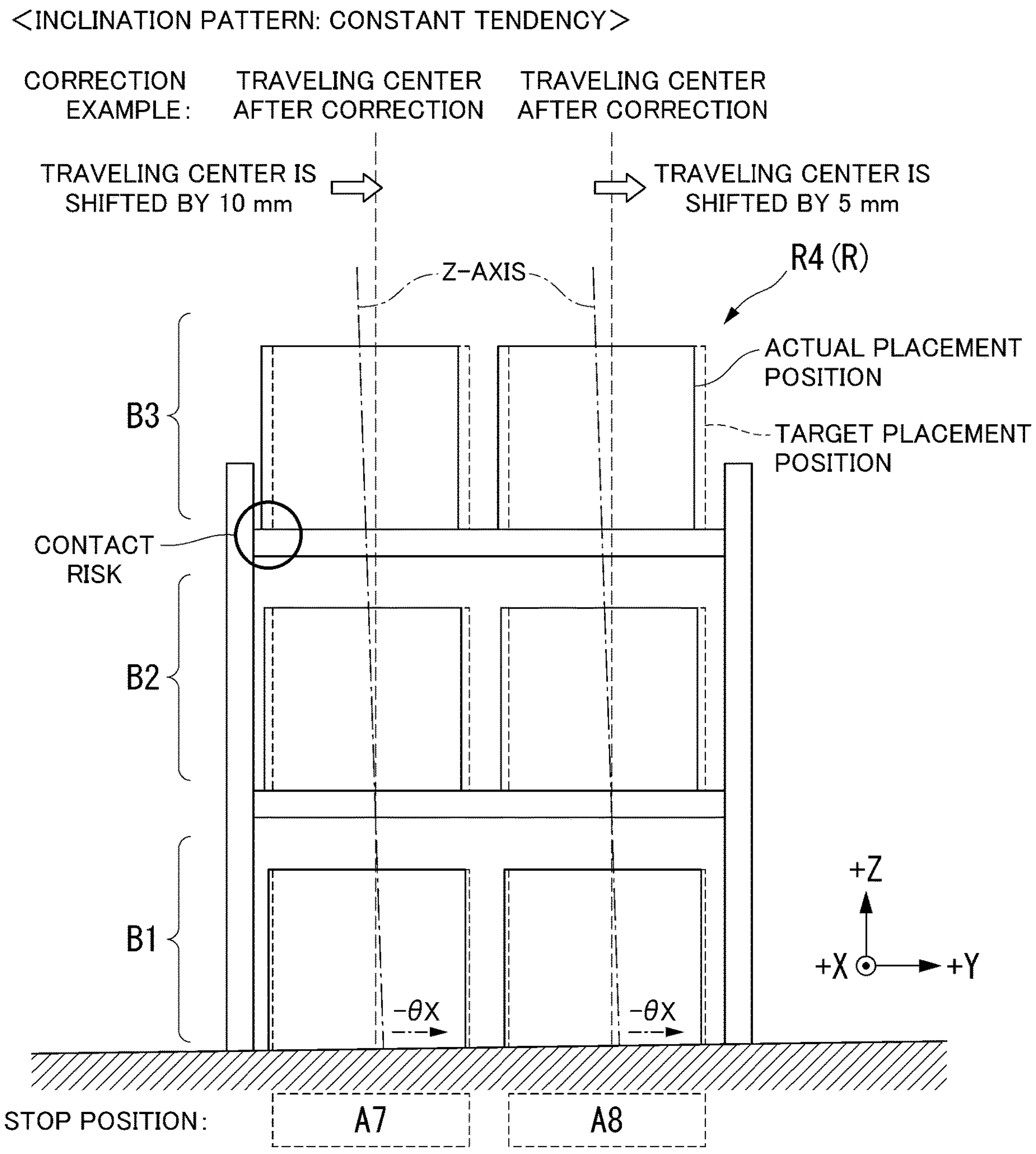
FIG. 7 is a third view illustrating an example of the inclination pattern according to the embodiment of the present disclosure.

FIG. 7 is a third view illustrating an example of the inclination pattern according to an embodiment of the present disclosure. As in an example in FIG. 7, it is assumed that the floor surfaces are inclined in the same direction (both are inclined downward to the left) at the stop positions A7 and A8 of the rack R4. In this way, when the operator detects the inclination pattern in which the same inclination is continuous (constant tendency) at the stop positions A5 and A6 which are continuous to the right and left (Step S201: NO), the operator does not set the stop positions A5 and A6, as the precise adjustment positions. The same applies when a plurality of the stop positions are continuous and horizontal.

In addition, with regard to a continuous rack in which the plurality of racks R are connected, the operator further sets the stop positions in both ends and the center in the right-left direction (X-direction in FIG. 1), as the precise adjustment positions (Step S203).

Figure 8:
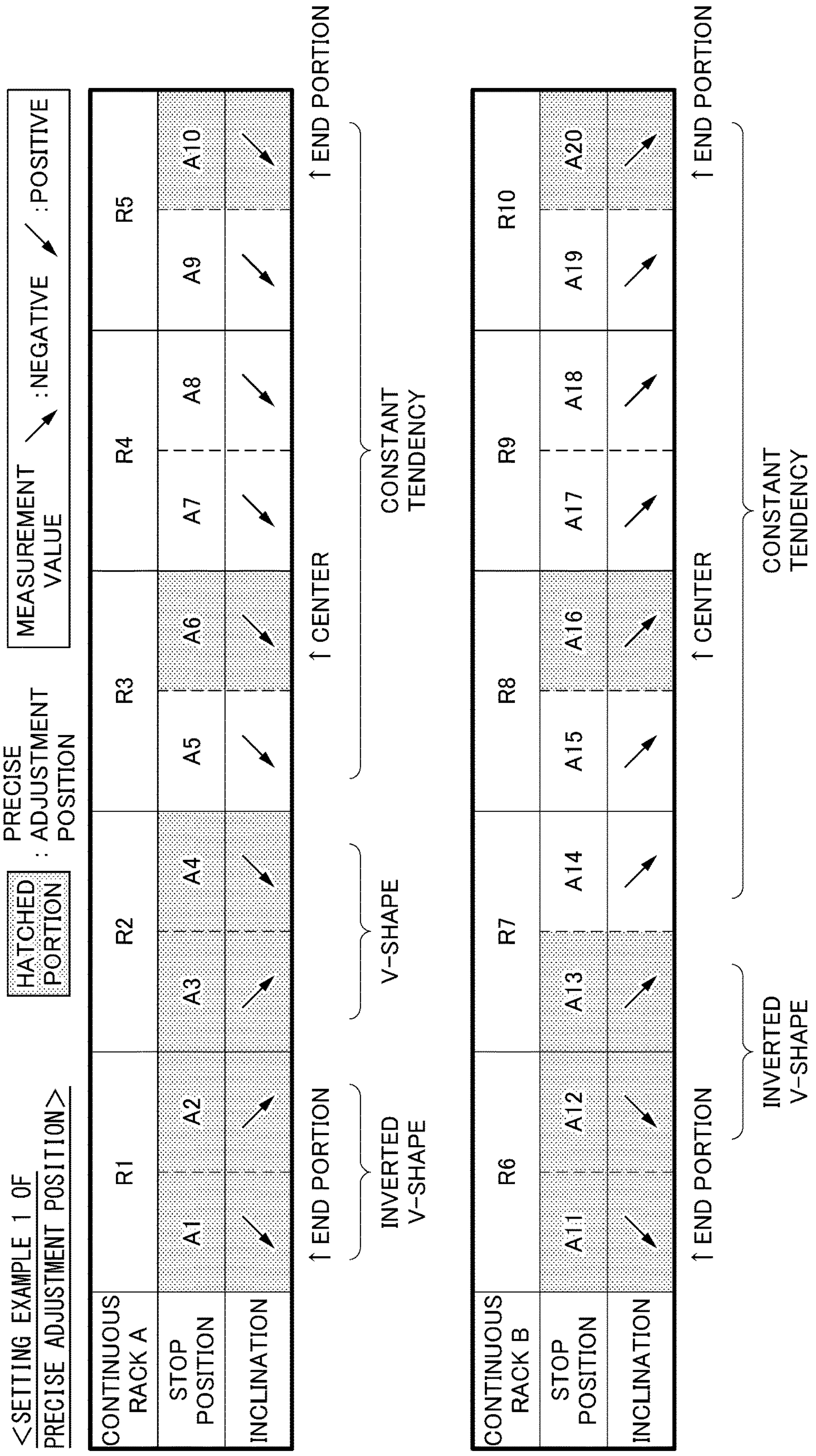
FIG. 8 is a first view illustrating a setting example of a precise adjustment position according to the embodiment of the present disclosure.

FIG. 8 is a first view illustrating a setting example of the precise adjustment position according to the embodiment of the present disclosure. As illustrated in FIG. 8, it is assumed that two continuous racks A and B are installed in the work area. The continuous rack A has racks R1 to R5 connected in the right-left direction (Y-direction in FIG. 1). The continuous rack B has racks R6 to R10 connected in the right-left direction (Y-direction in FIG. 1). The continuous rack A and the continuous rack B are not connected.

For example, the operator sets the stop positions A1 and A10 in both ends of the continuous rack A and the stop position A6 in the center, as the precise adjustment positions. Similarly, the operator sets the stop positions A11 and A20 in both ends of the continuous rack B and the stop positions A16 in the center, as the precise adjustment positions (Step S203 in FIG. 4). When the number of the stop positions A1 to A10 is an even number as in an example in FIG. 8, one of the stop positions A5 and A6 of the rack R3 in the center is selected, and is set as the precise adjustment position. The operator may determine to select any desired one.

In addition, FIG. 8 illustrates an example of the inclination of the Z-axis at each stop position of the continuous racks A and B. With regard to the continuous rack A, the stop positions A1 and A2 of the rack R1 have an inverted V-shape (FIG. 5) in which the inclination pattern is discontinuous (Step S201 in FIG. 4: YES). The stop positions A3 and A4 of the rack R2 have a V-shape (FIG. 6) in which the inclination pattern is discontinuous (Step S201 in FIG. 4: YES). Therefore, the operator sets the stop positions A1 to A4, as the precise adjustment positions (Step S202 in FIG. 4).

With regard to the continuous rack B, the inclination patterns are discontinuous (inverted V-shaped) at the stop position A12 of the rack R6 and the stop position A13 of the rack R7. In this way, with regard to the stop positions A12 and A13 which are continuous across the rack, when the inclination pattern is discontinuous (Step S201 in FIG. 4: YES), the stop positions A12 and A13 may be set as the precise adjustment positions (Step S202 in FIG. 4).

With regard to the continuous rack A, the inclination patterns having a constant tendency are continuous at the stop positions A5 to A10 of the racks R3 to R5 (Step S201 in FIG. 4: NO). Therefore, out of the stop positions A5 to A10, the stop positions A5, A7, A8, and A9 which do not correspond to the line of the end portion and the center of the continuous rack A are thinned out without being set as the precise adjustment positions. Similarly, with regard to the continuous rack B, the inclination patterns having the constant tendency are continuous at the stop positions A14 to A20 of the racks R7 to R10 (Step S201 in FIG. 4: NO). Out of the stop positions A14 to A20, the stop positions A14, A15, A17, A18, and A19 which do not correspond to the line of the end portion and the center of the continuous rack B are thinned out without being set as the precise adjustment positions. In this manner, with regard to the stop position where the inclination pattern is not changed, it is possible to omit the measurement of the deviation amount.

Figure 9:
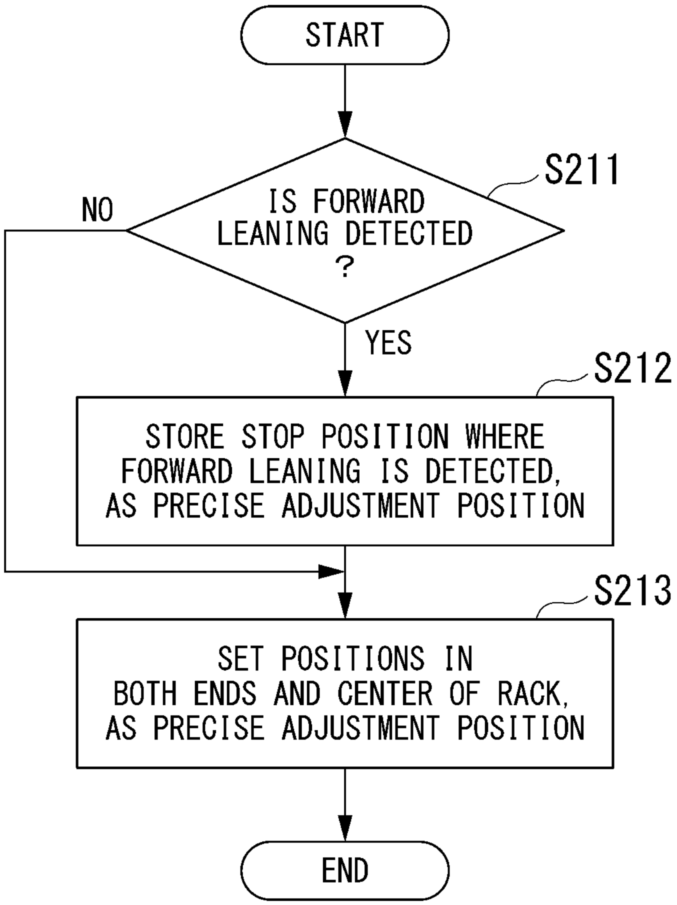
FIG. 9 is a third flowchart illustrating an example of the initial setting method according to the embodiment of the present disclosure.

FIG. 9 is a third flowchart illustrating an example of the initial setting method according to the embodiment of the present disclosure. The flowchart in FIG. 9 illustrates a setting procedure of the precise adjustment position which focuses on the floor surface inclination in the front-rear direction (X-direction in FIG. 1). Subsequent to the procedure in FIG. 4, the operator further sets the precise adjustment position in accordance with the procedure in FIG. 9. In another embodiment, the operator may perform the procedure in FIG. 9 before the procedure in FIG. 4.

With regard to each stop position of the plurality of racks R, when the fork 902 side (side facing the rack R serving as the unloading target) (−Fx-side in FIG. 1) of the unmanned forklift 90 is lower than the main body portion 900 side. (+Fx-side in FIG. 1) (that is, when the rack R side (−X-side) of the stop position is the front side, the unmanned forklift 90 is in a leaning state of being inclined to the front side of the stop position), the operator confirms the presence or absence of the inclination pattern (Step S211). When a measurement value (θY) of the second inclinometer 105 is a positive value equal to or greater than the upper limit value (for example, $\theta Y \geq +0.15$ degrees), the operator determines that the floor surface is inclined so that the fork 902 side of the unmanned forklift 90 is higher than the main body portion 900 side (so that the unmanned forklift 90 is inclined to the rear side (+X-side) of the stop position), and when the measurement value is a negative value equal to or smaller than the lower limit value (for example, $\theta Y \leq -0.15$ degrees), the operator determines that the floor surface is inclined so that the main body portion 900 side of the unmanned forklift 90 is higher than the fork 902 side (so that the unmanned forklift 90 is in a forward inclined posture in which the unmanned forklift 90 is inclined to the front side (−X-side) of the stop position). In addition, when the measurement value of the second inclinometer 105 falls within the range of the lower limit value to the upper limit value (for example, $-0.15$ degrees$<\theta Y<+0.15$ degrees), the operator determines that the floor surface is horizontal.

Figure 10:
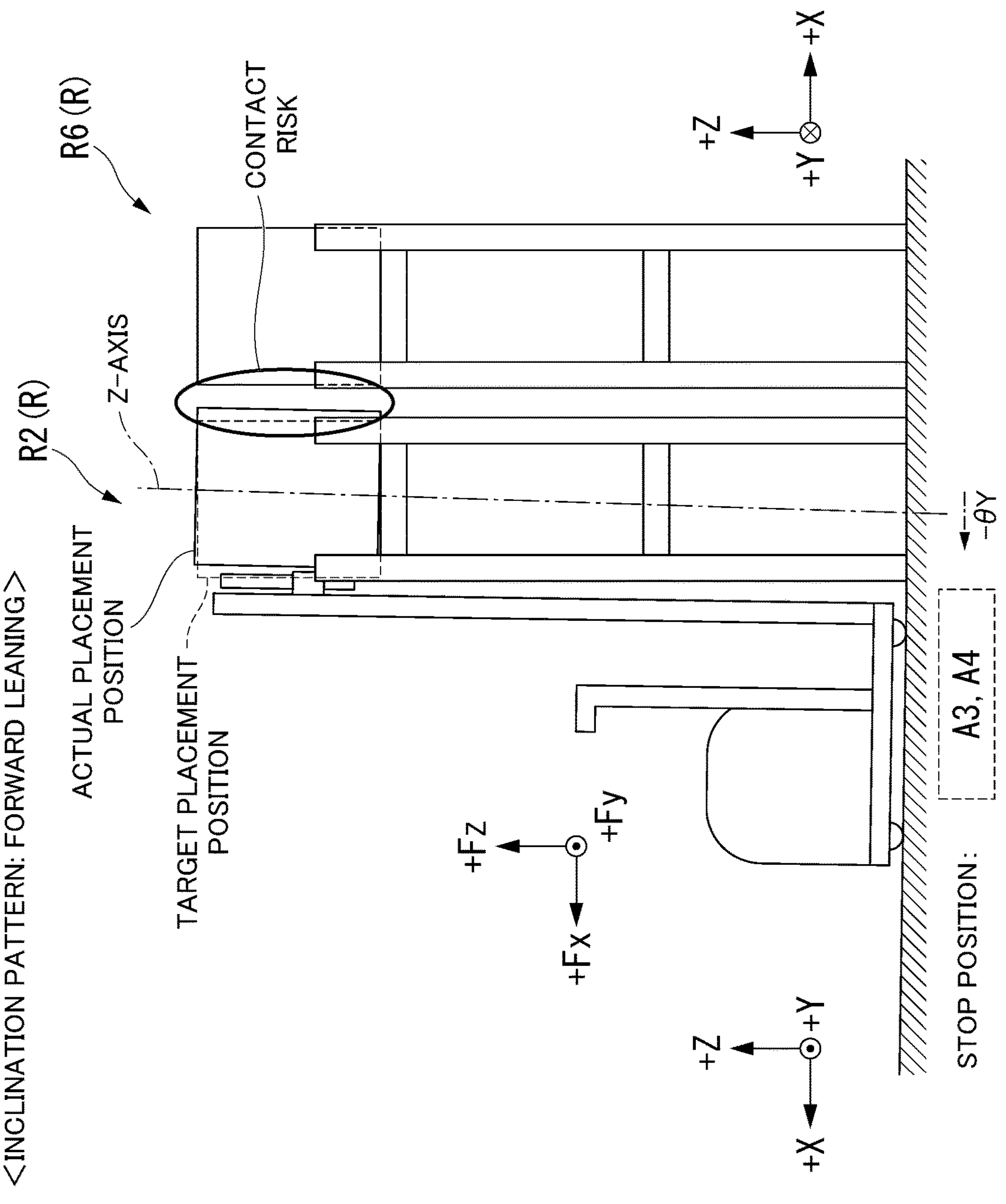
FIG. 10 is a fourth view illustrating an example of the inclination pattern according to the embodiment of the present disclosure.

FIG. 10 is a fourth view illustrating an example of the inclination pattern according to the embodiment of the present disclosure. As in an example in FIG. 10, it is assumed that the unmanned forklift 90 unloads the palette P on the rack R2. At the stop positions A3 and A4 of the rack R2, the rack R2 side (−X-side) is the front side, and a side (+X-side) away from the rack R2 is the rear side. In addition, in the example in FIG. 10, it is assumed that the floor surfaces at the stop positions A3 and A4 of the rack R2 are inclined so that the front side (−X-side) is lower than the rear side (+X-side).

When the unmanned forklift 90 is operated in the rack R2 having the inclination pattern in this way, the Fz-axis of the unmanned forklift 90 is in a forward leaning state of being inclined to the front side (−Fx-side) at the stop positions A3 and A4. In this case, when the unmanned forklift 90 unloads the palette P, the palette P tends to be placed on a back side (−X-side in FIG. 10) of the rack R2 from the target placement position. This tendency is particularly stronger toward the upper stage side. Accordingly, when the palette P is unloaded on the uppermost stage B3, there is a risk in that the palette P comes into contact with the palette P placed on the rack R (for example, the rack R6) installed behind the rack R2. With regard to the stop positions A3 and A4 having the contact risk, it is necessary to reduce the contact risk by precisely measuring the deviation amount of the unmanned forklift 90 and correcting the operation of the unmanned forklift 90 in accordance with the deviation amount.

Therefore, when the operator detects that the unmanned forklift 90 has the inclined pattern in which the unmanned forklift 90 is in a forward leaning state (Step S211: YES), the operator sets the stop positions A3 and A4, as the precise adjustment positions (Step S212).

In addition, the operator further sets the stop positions in both ends and the center of the continuous racks A and B, as the precise adjustment positions (Step S213). This process is the same as the process in Step S203 in FIG. 4. When the procedure in FIG. 4 is performed first and both ends and the center of each of the continuous racks A and B are already set as the precise adjustment positions, Step S213 may be omitted.

Figure 11:
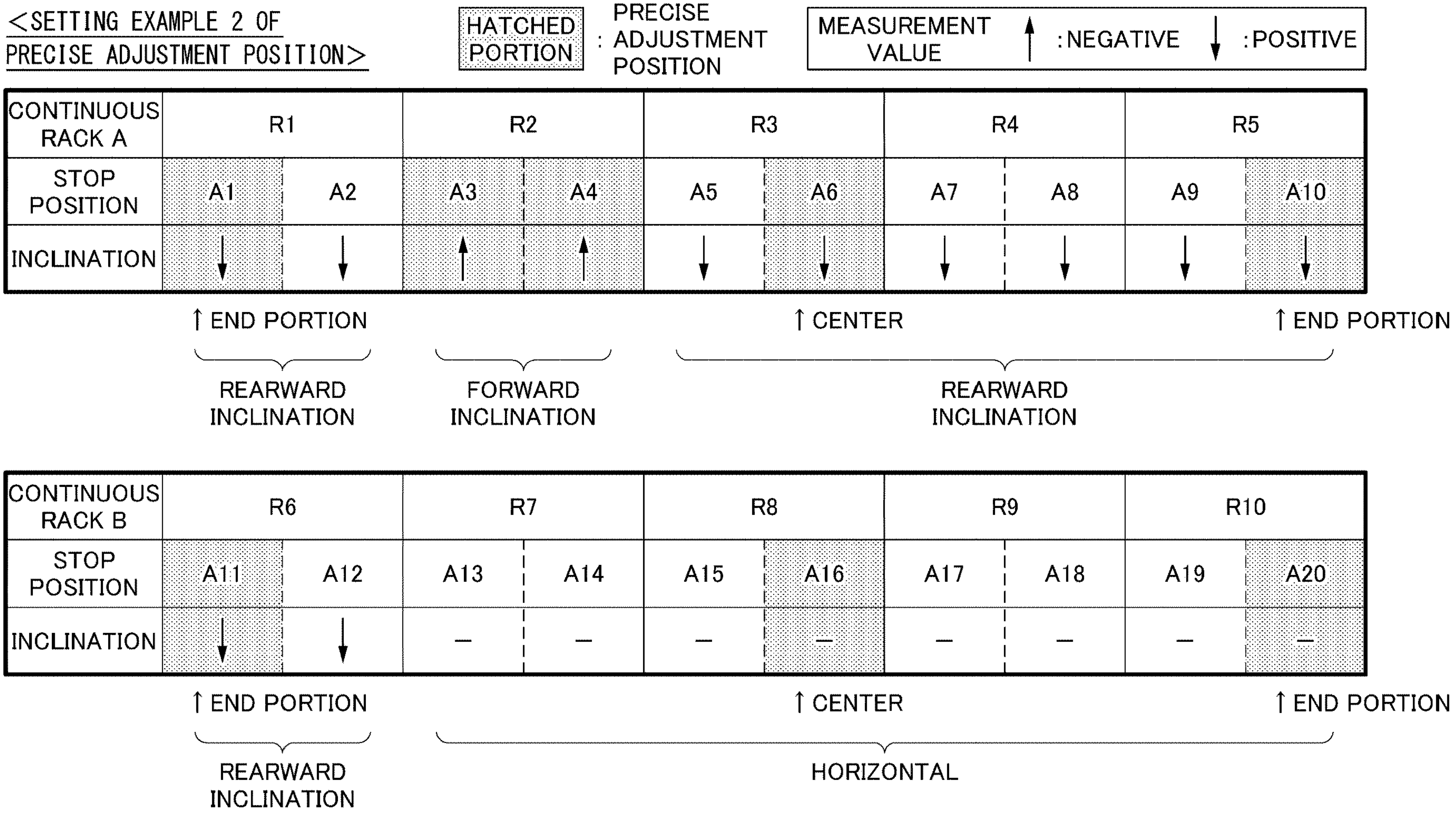
FIG. 11 is a second view illustrating a setting example of the precise adjustment position according to the embodiment of the present disclosure.

FIG. 11 is a second view illustrating a setting example of the precise adjustment position according to the embodiment of the present disclosure. FIG. 11 illustrates the inclination of the Z-axis of the continuous rack A (racks R1 to R5) and the continuous rack B (racks R6 to R10), and a setting example of the precise adjustment position. The continuous racks A and B in FIG. 11 are the same as the continuous racks A and B in FIG. 8.

For example, the operator sets the stop positions A1 and A10 in both ends of the continuous rack A and the stop position A6 in the center, as the precise adjustment positions. Similarly, the operator sets the stop positions A11 and A20 in both ends of the continuous rack B and the stop position A16 in the center, as the precise adjustment positions (Step S213 in FIG. 4).

With regard to the continuous rack A, the inclination patterns are inclined forward (FIG. 10) at the stop positions A3 and A4 of the rack R2 (Step S211 in FIG. 9: YES). Therefore, the operator sets these stop positions A3 and A4, as the precise adjustment positions (Step S212 in FIG. 9).

In addition, the inclination patterns are not inclined forward at other stop positions A1 to A2 and A5 to A10 of the continuous rack A and the stop positions A11 to A20 of the continuous rack B (Step S211 in FIG. 9: NO). Therefore, out of the stop positions A1 to A2, A5 to A10, and A11 to A20, the stop positions which do not correspond to the end portion and the center are thinned out without being set as the precise adjustment positions. In this manner, with regard to the stop position where the inclination pattern is not inclined forward, it is possible to omit the measurement of the deviation amount.

In the procedure for setting the precise adjustment position illustrated in FIGS. 4 and 9, the operator may input the measurement value of the inclination at each stop position to a computer (not illustrated), may cause the computer to calculate the inclination pattern, and may automatically set the precise adjustment position.

When the precise adjustment positions are completely set, the operator returns to the procedure in FIG. 3, and measures the deviation amount at each of the precise adjustment positions (Step S30). Specifically, the operator actually causes the unmanned forklift 90 to unload the palette P in accordance with a predetermined operation program for each of the stages B1 to B3 of the line which is the precise adjustment position, and measures the deviation amount between the target placement position and the actual placement position of the palette P.

Figure 12:
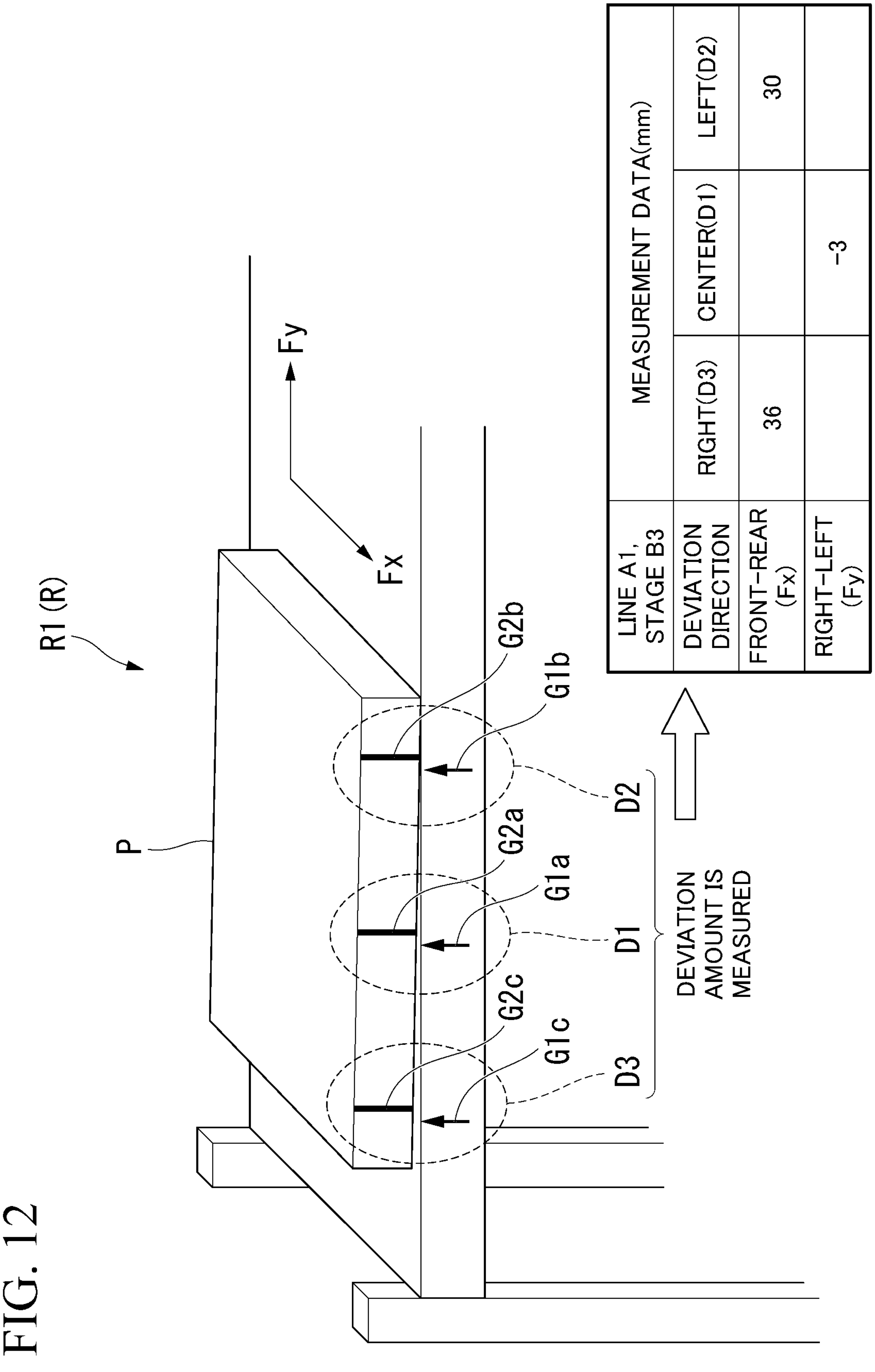
FIG. 12 is a view illustrating a measurement example of a deviation amount according to the embodiment of the present disclosure.

FIG. 12 is a view illustrating a measurement example of the deviation amount according to the embodiment of the present disclosure. As illustrated in FIG. 12, the operator assigns a guide G1*a* indicating a central reference position of the target placement position of the palette P, a guide G1*b* indicating a left reference position, and a guide G1*c* indicating a right reference position to each stage of the line set as the precise adjustment position. In addition, the operator assigns a guide G2*a* indicating the central reference position, a guide G2*b* indicating the left reference position, and a guide G2*c* indicating the right reference position to the palette P. The guides G2*a* to G2*c* of the palettes P are disposed so that the positions coincide with the positions of the guides G1*a* to G1*c* in the right-left direction and the front-rear direction (tip portions of arrows of the guides G1*a* to G1*c* coincide with lower end portions of the guides G2*a* to G2*c*) when the palette P is correctly placed in the target placement position. The right and left sides represent the left side (+Fy-side) and the right side (−Fy-side) when viewed in a direction in which the unmanned forklift 90 travels to the +Fx-side.

Here, as an example, a case will be described where the operator measures the deviation amount in the line A1 and the stage B3 of the rack R1. First, the operator causes the unmanned forklift 90 to unload the palettes P to which the guides G2*a* to G2*c* are assigned to the line A1 and the stage B3 of the rack R1.

When the palette P is placed, the operator first measures a deviation amount (D1) in the center. The operator measures a deviation amount ΔFy in the right-left direction (Fy-direction) of the guide G1*a* of the target placement position and the guide G2*a* of the palette P. In an example in FIG. 12, the deviation amount ΔFy in the right-left direction in the stage B3 of the line A1 is "−3 mm".

Next, the operator measures a deviation amount (D2) on the left side and a deviation amount (D3) on the right side of the unmanned forklift 90. The operator measures a deviation amount ΔFx in the front-rear direction (Fx-direction) of the guide G1*b* at the target placement position and the guide G2*b* of the palette P. Similarly, the operator measures the deviation amount ΔFx in the front-rear direction (Fx-direction) of the guide G1*c* at the target placement position and the guide G2*c* of the palette P. In an example in FIG. 12, the deviation amount ΔFx in the front-rear direction on the left side in the stage B3 of the line A1 is "30 mm", and the deviation amount ΔFx in the front-rear direction on the right side is "36 mm". In addition, the operator calculates a rotation angle θFz around the Z-axis of the unmanned forklift from the deviation amount ΔFx (D2) in the front-rear direction on the left side, the deviation amount ΔFx (D3) in the front-rear direction on the right side, and a distance between the guide G2*b* and the guide G2*c* of the palette P.

Next, the operator corrects the command value of the unmanned forklift 90, based on the measured deviation amount (deviation amount ΔFy in the right-left direction, deviation amount ΔFx in the front-rear direction, and deviation amount ΔθFz of the Fz-axis) (Step S40). Hereinafter, an example of a correction content will be described with reference to examples in FIGS. 5 to 7 and FIG. 10.

As illustrated in FIG. 5, it is assumed that the stop positions A1 and A2 of the rack R1 are inclined in an inverted V-shape. In this case, the operator corrects the command value of a traveling center (movement amount of the rack R in the right-left direction) of the unmanned forklift 90, based on the measured deviation amount. For example, the operator corrects the command value so that the traveling center of the unmanned forklift 90 is shifted by 5 mm to the right side (−Fy-side) of the unmanned forklift 90 at the stop position A1 of the rack R1. In addition, the operator corrects the command value so that the traveling center of the unmanned forklift 90 is shifted by 5 mm to the left side (+Fy-side) of the unmanned forklift 90 at the stop position A2 of the rack R1.

As illustrated in FIG. 6, it is assumed that the stop positions A3 and A4 of the rack R2 are inclined in a V-shape. In this case, the operator corrects the command value of a traveling center (movement amount of the rack R in the right-left direction) of the unmanned forklift 90, based on the measured deviation amount. For example, the operator corrects the command value so that the traveling center of the unmanned forklift 90 is shifted by 5 mm to the left side (+Fy-side) of the unmanned forklift 90 at the stop position A3 of the rack R2. In addition, the operator corrects the command value so that the traveling center of the unmanned forklift 90 is shifted by 5 mm to the right side (−Fy-side) of the unmanned forklift 90 at the stop position A4 of the rack R2.

In addition, as illustrated in FIG. 7, it is assumed that the stop positions A7 and A8 of the rack R4 have constant inclination and are not set as the precise adjustment positions (deviation amount is not measured). In this way, with regard to the stop position where the deviation amount is not measured, the operator estimates the deviation amount, based on the deviation amount at the stop position set as the precise adjustment position adjacent thereto. In an example in FIG. 8, the deviation amount is not measured at the stop positions A7 to A9 of the continuous rack A. In this case, the operator calculates the deviation amount (estimated deviation amount) at the stop positions A7 to A9 located in the middle, based on the deviation amount at the stop position A6 and the stop position A10. Then, the operator corrects the command value of the unmanned forklift 90, based on the calculated estimated deviation amount. For example, as illustrated in FIG. 7, the operator corrects the command value so that the traveling center of the unmanned forklift 90 is shifted by 10 mm to the left side (+Fy-side) of the unmanned forklift 90 at the stop position A7 of the rack R4. In addition, the operator corrects the command value so that the traveling center of the unmanned forklift 90 is shifted by 5 mm to the left side (+Fy-side) of the unmanned forklift 90 at the stop position A8 of the rack R2.

As illustrated in FIG. 10, it is assumed that the stop positions A3 and A4 of the rack R2 are inclined so that the unmanned forklift 90 is in a forward leaning state. In this case, for example, the operator corrects the command value of the distance (movement amount in the depth direction of the rack R) between the unmanned forklift 90 and the rack R2, based on the measured deviation amount.

The operator may input the measurement value of the deviation amount to a computer (not illustrated), may calculate the estimated deviation amount at the stop position where the precise adjustment position is not set in the computer, and may automatically calculate a correction amount of the command value.

Operational Effect

As described above, the initial setting method for the unmanned forklift 90 according to the present embodiment includes a step (S10) of acquiring the measurement value of floor surface inclination of the stop position, a step (S20) of setting the stop position where a predetermined inclination pattern is detected, as the precise adjustment position, from the acquired measurement value, a step (S30) of causing the unmanned forklift 90 to unload the palette P in accordance with an operation program, and measuring the deviation amount of the palette P unloaded by the unmanned forklift 90, at the precise adjustment position, and a step (S40) of correcting the command value of the unmanned forklift 90 at the stop position, based on the measured deviation amount.

In this manner, it is possible to suppress degradation in the operation accuracy of the unmanned forklift 90 by precisely measuring the deviation amount and correcting the command value with regard to the stop position where the predetermined inclination pattern is detected. On the other hand, it is possible to improve the efficiency of the initial setting of the unmanned forklift 90 by omitting the measurement of the deviation amount at other stop positions.

In addition, in the step (S20) of setting the precise adjustment position, the stop positions corresponding to both ends and the center of the continuous rack in the right-left direction are further set as the precise adjustment positions.

In this manner, the minimum stop positions of the continuous rack can be set as the precise adjustment positions. In this manner, it is possible to estimate and supplement the deviation amount at other stop positions, based on the deviation amounts at the stop positions in both ends and the center of the continuous rack.

In addition, in the step (S20) of setting the precise adjustment position, when the inclination pattern is detected in which the floor surfaces of the stop positions continuous in the right-left direction are inclined in the opposite directions in the right-left direction (inclined in an inverted V-shape or a V-shape), the stop positions are set as the precise adjustment positions.

In this manner, it is possible to precisely measure the deviation amount at the stop position where the inclination tendency is changed, and it is possible to properly correct the command value relating to the operation of the unmanned forklift 90. In this manner, it is possible to suppress degradation in the operation accuracy of the unmanned forklift 90.

In addition, in the step (S20) of setting the precise adjustment position, when the inclination pattern (forward leaning) is detected in which the floor surface of the stop position is lower on the front side than on the rear side of the unmanned forklift 90, the stop position is set as the precise adjustment position.

In this manner, in a place where the unmanned forklift 90 leans forward, it is possible to precisely measure the deviation amount, and it is possible to properly correct the command value relating to the operation of the unmanned forklift 90. In this manner, it is possible to suppress degradation in the operation accuracy of the unmanned forklift 90.

In addition, in the step (S10) of acquiring the measurement value, the wheel positions in the right-left direction and the front-rear direction of the unmanned forklift 90 is simulated. The jig 10 equipped with the first inclinometer 104 for measuring the inclination in the right-left direction and the second inclinometer 105 for measuring the inclination in the front-rear direction are disposed at the stop positions, and the measurement value of the floor surface inclination at the stop position is acquired.

In this manner, it is possible to easily simulate how much the unmanned forklift 90 is inclined at each of the stop positions without actually operating the unmanned forklift 90.

In addition, in the step (S40) of correcting the command value, with regard to the stop position which is not set as the precise adjustment position, the command value is corrected, based on the estimated deviation amount estimated from the deviation amount measured at the stop position set as the precise adjustment position located on the right and left sides.

In this manner, with regard to the stop position where the measurement of the deviation amount is omitted, it is also possible to estimate how much deviation occurs from the deviation amount at other stop positions. In this manner, even when the measurement of the deviation amount is omitted, it is possible to suppress degradation in the operation accuracy of the unmanned forklift 90.

As described above, the embodiments according to the present disclosure have been described. However, the above-described embodiments are presented as examples, and are not intended to limit the scope of the invention. The embodiments can be implemented in various other forms, and various omissions, substitutions, and modifications can be made within the scope not departing from the concept of the invention. The embodiments or modifications thereof are included in the scope or the concept of the invention, and are also included in the scope of the invention described in the appended claims and an equivalent scope thereof.

Appendix

The initial setting method for the unmanned forklift described in the above-described embodiment can be understood as follows, for example.

(1) According to a first aspect of the present disclosure, the initial setting method for the unmanned forklift (90) includes a step (S10) of acquiring a measurement value of floor surface inclination of a stop position where the unmanned forklift (90) stops when the unmanned forklift (90) unloads a palette on a rack, a step (S20) of setting the stop position where a predetermined inclination pattern is detected, as a precise adjustment position, from the acquired measurement value, a step (S30) of causing the unmanned forklift (90) to unload the palette in accordance with an operation program, and measuring a deviation amount of the palette unloaded by the unmanned forklift (90), at the precise adjustment position, and a step of correcting a command value of the unmanned forklift at the stop position, based on the measured deviation amount.

In this manner, it is possible to suppress degradation in the operation accuracy of the unmanned forklift by precisely measuring the deviation amount and correcting the command value with regard to the stop position where a predetermined inclination pattern is detected. On the other hand, it is possible to improve the efficiency of the initial setting of the unmanned forklift by omitting the measurement of the deviation amount at other stop positions.

(2) According to a second aspect of the present disclosure, in the step (S20) of setting the precise adjustment position, stop positions corresponding to both ends and a center of a continuous rack formed by connecting a plurality of the racks in a right-left direction are further set as the precise adjustment positions.

In this manner, the minimum stop positions of the continuous rack can be set as the precise adjustment positions. In this manner, it is possible to estimate and supplement the deviation amount at other stop positions, based on the deviation amounts at the stop positions in both ends and the center of the continuous rack.

(3) According to a third aspect of the present disclosure, in the step (S20) of setting the precise adjustment position, when an inclination pattern is detected in which floor surfaces of a first stop position and a second stop position which are continuous in a right-left direction are respectively inclined in opposite directions in the right-left direction, the first stop position and the second stop position are set as the precise adjustment positions.

In this manner, it is possible to precisely measure the deviation amount at the stop position where the inclination tendency is changed, and it is possible to properly correct the command value relating to the operation of the unmanned forklift. In this manner, it is possible to suppress degradation in the operation accuracy of the unmanned forklift.

(4) According to a fourth aspect of the present disclosure, in the step (S20) of setting the precise adjustment position, when an inclination pattern is detected in which a floor surface of the stop position is lower on a front side than on a rear side of the unmanned forklift (90), the stop position is set as the precise adjustment position.

In this manner, in a place where the unmanned forklift leans forward, it is possible to precisely measure the deviation amount, and it is possible to properly correct the command value relating to the operation of the unmanned forklift. In this manner, it is possible to suppress degradation in the operation accuracy of the unmanned forklift.

(5) According to a fifth aspect of the present disclosure, in the step (S10) of acquiring the measurement value, wheel positions of the unmanned forklift (90) in a right-left direction and a front-rear direction are simulated, a jig (10) equipped with a first inclinometer (104) for measuring inclination in the right-left direction and a second inclinometer (105) for measuring inclination in the front-rear direction is disposed at the stop position, and the measurement value of the floor surface inclination at the stop position is acquired.

In this manner, it is possible to easily simulate how much the unmanned forklift is inclined at each of the stop positions without actually operating the unmanned forklift.

(6) According to a sixth aspect of the present disclosure, in the step (S40) of correcting the command value, the command value for the stop position which is not set as the precise adjustment position is corrected, based on an estimated deviation amount calculated from the deviation amount measured at the stop positions which are set as the precise adjustment positions located on right and left sides.

In this manner, with regard to the stop position where the measurement of the deviation amount is omitted, it is also possible to estimate how much deviation occurs from the deviation amount at other stop positions. In this manner, even when the measurement of the deviation amount is omitted, it is possible to suppress degradation in the operation accuracy of the unmanned forklift.

REFERENCE SIGN LIST

10 jig
101 main body portion
101*a* first portion
101*b* second portion
102 rear wheel simulation portion
103 front wheel simulation portion
104 first inclinometer
105 second inclinometer
106 positioning tool
107 handle
90 unmanned forklift
900 main body portion
901 lift device
902 fork
P palette
R rack

The invention claimed is:

1. An initial setting method for an unmanned forklift, comprising:

- a step of acquiring a measurement value of floor surface inclination of a stop position where the unmanned forklift stops when the unmanned forklift unloads a palette on a rack;
- a step of setting the stop position where a predetermined inclination pattern is detected, as a precise adjustment position, from the acquired measurement value;
- a step of causing the unmanned forklift to unload the palette in accordance with an operation program, and measuring a deviation amount of the palette unloaded by the unmanned forklift, at the precise adjustment position; and
- a step of correcting a command value of the unmanned forklift at the stop position, based on the measured deviation amount.

2. The initial setting method for an unmanned forklift according to claim 1, wherein, in the step of setting the precise adjustment position, stop positions corresponding to both ends and a center of a continuous rack formed by connecting a plurality of the racks in a right-left direction are further set as the precise adjustment positions.

3. The initial setting method for an unmanned forklift according to claim 1, wherein, in the step of setting the precise adjustment position, when an inclination pattern is detected in which floor surfaces of a first stop position and a second stop position which are continuous in a right-left direction are respectively inclined in opposite directions in the right-left direction, the first stop position and the second stop position are set as the precise adjustment positions.

4. The initial setting method for an unmanned forklift according to claim 1, wherein, in the step of setting the precise adjustment position, when an inclination pattern is detected in which a floor surface of the stop position is lower on a front side than on a rear side of the unmanned forklift, the stop position is set as the precise adjustment position.

5. The initial setting method for an unmanned forklift according to claim 1, wherein, in the step of acquiring the measurement value, wheel positions of the unmanned forklift in a right-left direction and a front-rear direction are simulated, a jig equipped with a first inclinometer for measuring inclination in the right-left direction and a second inclinometer for measuring inclination in the front-rear direction is disposed at the stop position, and the measurement value of the floor surface inclination at the stop position is acquired.

6. The initial setting method for an unmanned forklift according to claim 1, wherein, in the step of correcting the command value, the command value for the stop position which is not set as the precise adjustment position is corrected, based on an estimated deviation amount calculated from the deviation amount measured at the stop positions which are set as the precise adjustment positions located on right and left sides.

* * * * *